J. A. ANGLADA.
VEHICLE WHEEL RIM.
APPLICATION FILED OCT. 28, 1910.
1,095,770.
Patented May 5, 1914.
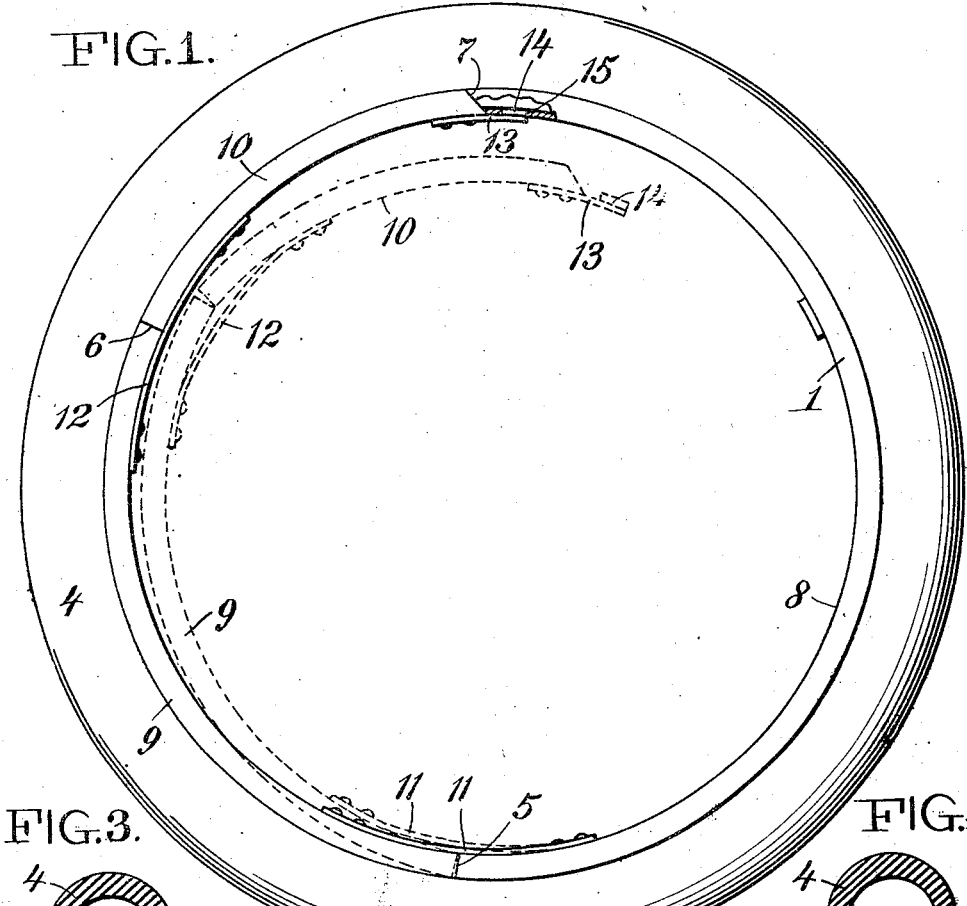
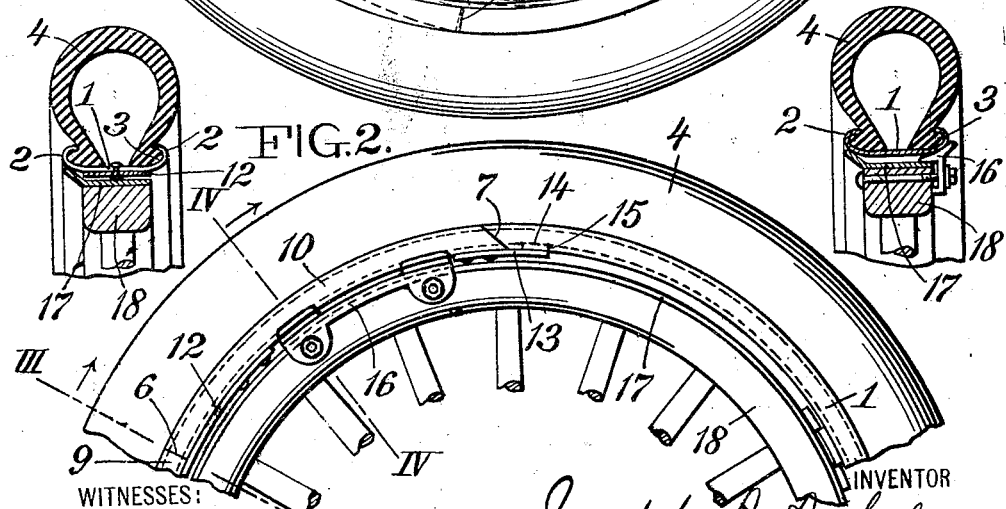
WITNESSES:
Edmund Quincy Moses III
Gerald E. Terwilliger
INVENTOR
Joseph A. Anglada
BY
Edward Davis ATTORNEY

UNITED STATES PATENT OFFICE.

JOSEPH A. ANGLADA, OF NEW YORK, N. Y., ASSIGNOR, BY MESNE ASSIGNMENTS, TO UNIVERSAL RIM COMPANY, OF CHICAGO, ILLINOIS, A CORPORATION OF ILLINOIS.

VEHICLE WHEEL-RIM.

1,095,770. Specification of Letters Patent. Patented May 5, 1914.

Application filed October 28, 1910. Serial No. 589,520.

*To all whom it may concern:*

Be it known that I, JOSEPH A. ANGLADA, a citizen of the United States, residing in the borough of Manhattan, city, county, and State of New York, have invented certain new and useful Improvements in Vehicle Wheel-Rims, of which the following is a specification.

This invention relates to vehicle wheel rims of the type adapted to carry a pneumatic or other resilient tire, and particularly to an improved form of tire-carrying rim adapted to be detachably secured to a vehicle wheel. Tire carrying rims of this character are provided with flanges adapted to receive and retain the beads of the tire, and when these rims are constructed in one piece, as is usually the case, difficulty is experienced in stretching the beads of the tire over the flanges in order to apply the tire to or remove it from the rim. With one piece rims it is impossible to use tires with inextensible beads.

In the accompanying drawings which form a part of this specification, Figure 1 is a side elevation showing my rim detached from the wheel and having a pneumatic tire mounted thereon, the rim being shown in dotted lines as partially collapsed, ready to be removed from the tire. Fig. 2 is a side elevation showing a portion of a vehicle wheel with the rim and tire applied thereto. Fig. 3 is a section on line III—III of Fig. 2, and Fig. 4 is a section on line IV—IV of Fig. 2.

Referring to the drawings in detail, the numeral 1 designates the tire-carrying rim provided with the side flanges 2, which receive the beads 3 of the tire 4. While I have illustrated this rim as a clencher rim, it is obvious that it may be shaped to receive a straight-sided or other type of tire.

The rim 1 is transversely split at the points 5, 6, and 7, the rim thus being divided into an approximately semicircular segment 8, and two shorter segments 9 and 10 respectively. The segments 8 and 9 are permanently secured together by means of a flat resilient member or leaf spring 11, preferably of spring steel, the ends of which are riveted or otherwise suitably secured to the rim segments. A similar resilient strip or spring 12 secures the segment 10 to the segment 9. A locking means of any desired nature is provided between the segment 10 and the segment 8 at the point 7. As shown, the end of the segment 10 has riveted to it a latch 13, the end of which carries a lug 14, which enters a slot 15 in the end of segment 8. The rim is preferably split at the point 7 on a plane inclined to a radius of the wheel.

For securing the rim and tire upon the wheel any suitable means may be used, such as a series of wedges 16 of the form shown in Figs. 2 and 4, these wedges having portions entering between the felly band 17 mounted upon the wheel felly 18, and the inner surface of the tire-carrying rim 1. The wedges in addition to retaining the tire-carrying rim upon the wheel, assist in positively holding the same in expanded position, and effectually prevent the disengagement of the lug 14 from the slot 15.

In the operation of my device, it will be seen that to apply a tire to the rim it is merely necessary to collapse the rim as shown in dotted lines in Fig. 1, and slip the tire thereover. By reason of the fact that the segments of the rim are connected by the flexible members or springs 11, this collapsing can be readily accomplished. After the tire has been slipped over the rim, the latter is expanded and the ends of the rim segments secured together at the point 7. The rim and tire may then be secured to the wheel by means of the wedges 16, or in any other suitable manner.

Having thus described one preferred embodiment of my invention, but without desiring to limit myself to the details set forth and illustrated, I claim:

1. A detachable tire-carrying rim for vehicle wheels transversely split at a plurality of points, the ends of said rim segments at one of said points at least being secured together by means of a strip of spring metal, the ends of which are permanently secured to the inner sides of the rim segments.

2. A detachable tire-carrying rim for vehicle wheels transversely split into three segments, the adjacent ends of the first and second segments, and second and third segments being permanently but flexibly connected together, means being provided for separably connecting the free ends of the third and first segments.

3. A transversely split integrally flanged tire-carrying demountable rim having a hole 15 in one end, in combination with a rigid latch 13 fixed on the other end of the rim, extending beneath the end containing said hole and having a lug to snap into said hole, to connect said ends.

4. An integrally flanged tire-carrying demountable rim transversely split upon a plane inclined to a radius of the rim and having a hole 15 in one end, in combination with a rigid latch member 13 on the other end of the rim, extending beneath the end containing said hole and having a lug 14 to snap into said hole, to separably connect said ends of the rim.

JOSEPH A. ANGLADA.

Witnesses:
DAVID C. ANDERSON,
KARL S. DEITZ.